United States Patent
Ryu et al.

(10) Patent No.: US 8,982,221 B2
(45) Date of Patent: Mar. 17, 2015

(54) PHOTOGRAPHY DEVICE WITH A SHAKE-CORRECTION STRUCTURE

(71) Applicant: Hysonic. Co., Ltd., Ansan-si (KR)

(72) Inventors: Jae-Wook Ryu, Ansan (KR); He-Won Jung, Ansan (KR); Hye-Kyoung Ji, Ansan-si (KR)

(73) Assignee: Hysonic Co., Ltd. (KR)

( * ) Notice: Subject to any disclaimer, the term of this patent is extended or adjusted under 35 U.S.C. 154(b) by 0 days.

(21) Appl. No.: 14/012,042

(22) Filed: Aug. 28, 2013

(65) Prior Publication Data

US 2013/0343737 A1 Dec. 26, 2013

Related U.S. Application Data

(62) Division of application No. 12/992,418, filed as application No. PCT/KR2009/001644 on Mar. 31, 2009, now Pat. No. 8,681,227.

(30) Foreign Application Priority Data

| May 14, 2008 | (KR) | 10-2008-0044348 |
| Oct. 15, 2008 | (KR) | 10-2008-0101010 |
| Dec. 17, 2008 | (KR) | 10-2008-0128375 |
| Mar. 20, 2009 | (KR) | 10-2009-0023717 |
| Mar. 20, 2009 | (KR) | 10-2009-0023718 |

(51) Int. Cl.
  *H04N 5/228* (2006.01)
  *G03B 5/00* (2006.01)
  *H04N 5/225* (2006.01)
  *H04N 5/232* (2006.01)
  *G03B 5/02* (2006.01)

(52) U.S. Cl.
  CPC ........... *G03B 5/00* (2013.01); *H04N 5/2252* (2013.01); *H04N 5/2254* (2013.01); *H04N 5/2257* (2013.01); *H04N 5/23248* (2013.01); *H04N 5/23287* (2013.01); *G03B 5/02* (2013.01)
  USPC ..................... 348/208.11; 348/46; 348/208.2

(58) Field of Classification Search
  CPC ............ H04N 5/2252; H04N 5/23287; H04N 5/23248
  USPC .................... 348/46, 208.2, 208.11
  See application file for complete search history.

(56) References Cited

U.S. PATENT DOCUMENTS

| 5,266,988 A | 11/1993 | Washisu |
| 2007/0154198 A1* | 7/2007 | Oh et al. .................. 396/85 |

FOREIGN PATENT DOCUMENTS

| JP | 1999-013837 | 4/1999 |
| KR | 10-2007-0120260 | 12/2007 |

OTHER PUBLICATIONS

International Search Report—PCT/KR2009/001644 dated May 29, 2009.

* cited by examiner

*Primary Examiner* — Usman Khan
(74) *Attorney, Agent, or Firm* — Cantor Colburn LLP

(57) ABSTRACT

A photography device with anti-shake function for sensing camera shake and moving a lens toward a direction to correct the camera shake when photographing an object so that the object may be clearly photographed. A coil and a magnet are included in the invention, and the coil moves in a direction perpendicular to the optical-axis of the lens as a result of magnetic fields generated by the magnet and the coil when electric power is applied to the coil.

6 Claims, 5 Drawing Sheets

PHOTOGRAPHY DEVICE WITH A SHAKE-CORRECTION STRUCTURE

BACKGROUND OF THE INVENTION

1. Field of the Invention

The present invention relates to a photography device with anti-shake function, and more particularly, to a photography device which senses shake of the photography device and moves lens in a direction correcting the shake to thereby allow an object to be clearly photographed.

2. Description of the Prior Art

In recent, compact electronic devices including a communication device such as a cellular phone are equipped with a compact photography device for photographing an image. These photography devices are characterized by compact and simple structure.

These photography devices includes a lens group consisting of a plurality of lenses and an image pickup device which converts optical signals transmitted through the lens group into electric signals.

However, when a user's hand grasping the electronic device equipped with the photography device is shaken or vibration is transferred to the electronic device by another external factor, the vibration is transferred to the photography device and thus the image of an object is blurred.

A support is required to photograph a clear image Due to this problem, but is hardly used since it is uncomfortable to be carried.

Therefore, deterioration in an image due to shake is inevitable for the general photography device for electronic devices.

SUMMARY OF THE INVENTION

Embodiments of the present invention are directed to a photography device which senses shake of the photography device upon photographing of an object and moves lens in a direction correcting the shake to thereby allow the object to be clearly photographed.

In one embodiment, a photography device with anti-shake function includes: a housing; a holder mounted horizontally movably to the housing; a lens unit mounted up and down movably in an inside of the holder and including a lens therein; a first coil member mounted in an outside of the lens unit; a second coil member mounted to the holder; a magnet mounted to a side surface of the housing; and an iron piece member having one end which is in contact with the magnet and the other end which is disposed adjacently to the first coil member, wherein the lens unit moves up and down by interaction of a magnetic field generated by the magnet and induced via the iron piece member with a first electromagnetic field generated when power is applied to the first coil member, and the holder moves horizontally by interaction of the magnetic field generated by the magnet and induced via the iron piece member with a second electromagnetic field generated when power is applied to the second coil member.

The first coil member is wound on an outer circumferential surface of the lens unit with respect to an optical axis of the lens, the second coil member is wound in a hollowed cylindrical shape and mounted on an outer circumferential surface of the holder, and the iron piece member penetrates the second coil member.

The holder includes a through hole penetratively formed in a side surface of the holder so that an inside and outside of the holder communicates with each other; and a fixation projection projecting towards the magnet from both sides of the through hole, wherein the second coil member is inserted on the fixation projection and the iron piece member passes through the second coil member between the fixation projections and is penetratively inserted in the through hole.

The magnet is mounted to upper and lower ends of the iron piece member, respectively, and the polarities on sides in contact with the iron piece are the same.

The photography device further includes: a first elastic member mounted to the lens unit to elastically support the lens unit in an up and down direction and electrically connected with the first coil member; and a power terminal connected with the first elastic member to transfer power to the first coil member via the first elastic member, wherein the power terminal includes a first extension part formed parallel to an outer surface of the holder; and a second extension unit bent from the first extension part.

The photography device further includes: a second elastic member having one end mounted to the housing and the other end mounted to the holder to elastically support the holder in a horizontal direction, wherein the second elastic member is connected with the second coil member to transfer the power to the second coil member.

The second coil member is provided in plural such that a pair of the second coil members is mounted on the outer surface of the holder facing with each other, and the second elastic member is provided in plural such that the second elastic member applies the same power to the pair of facing second coil members.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, an embodiment of the present invention will be described.

Figure 1:
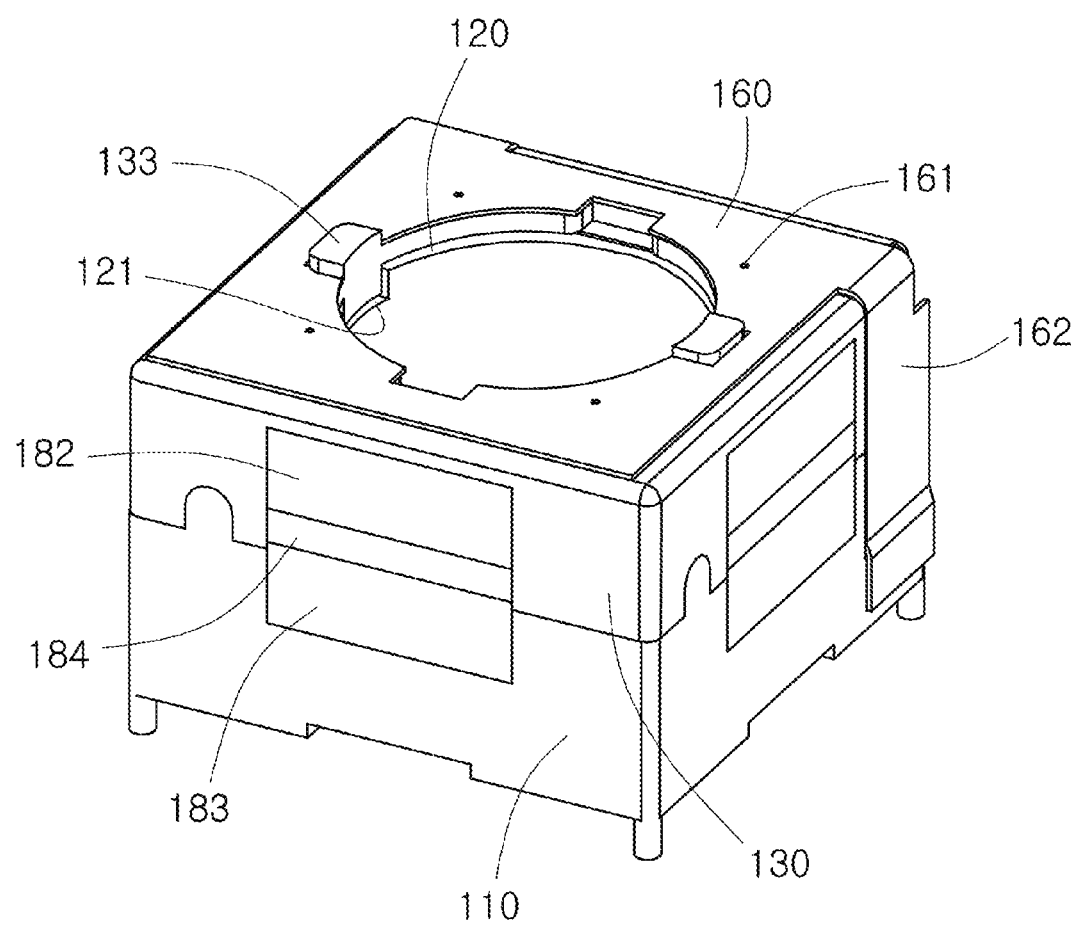
FIG. 1 is a perspective view illustrating a photography device with anti-shake function in accordance with a second embodiment of the present invention.
Figure 2:
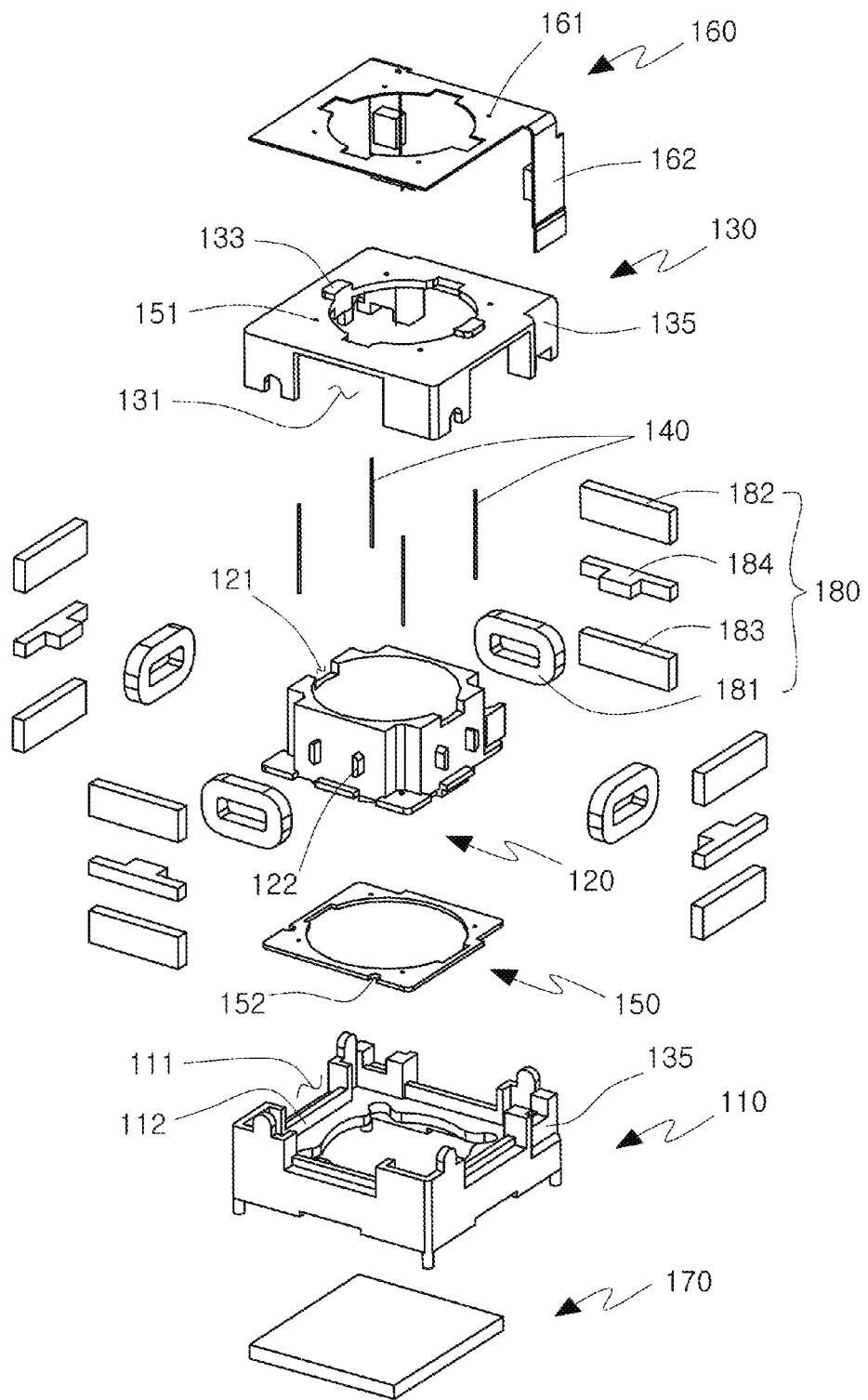
FIG. 2 is an exploded perspective view illustrating the photography device of FIG. 1, viewed from one direction.

FIG. 1 is a perspective view illustrating a photography device with anti-shake function in accordance with a second embodiment of the present invention; FIG. 2 is an exploded perspective view illustrating the photography device of FIG. 1, viewed from one direction; and FIG. 3 is an exploded perspective view illustrating the photography device of FIG. 1, viewed from another direction.

Figure 4:
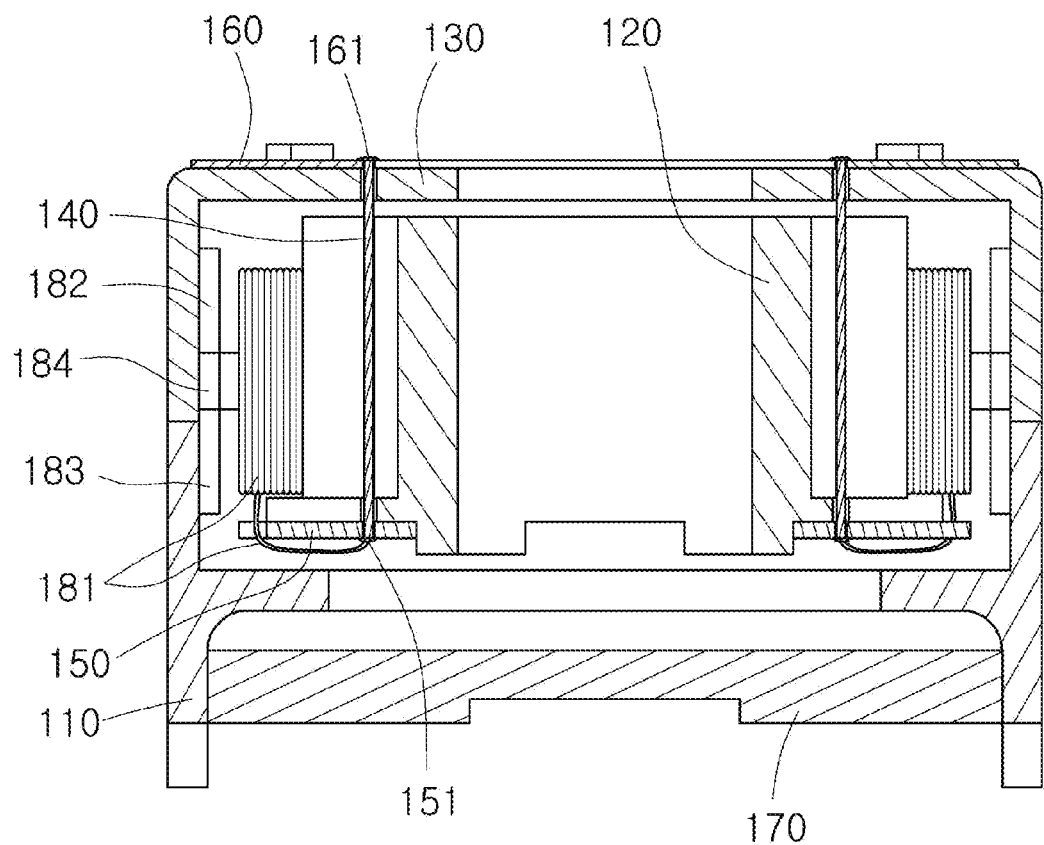
FIG. 4 is a sectional view illustrating the photography device of FIG. 1.
Figure 5:
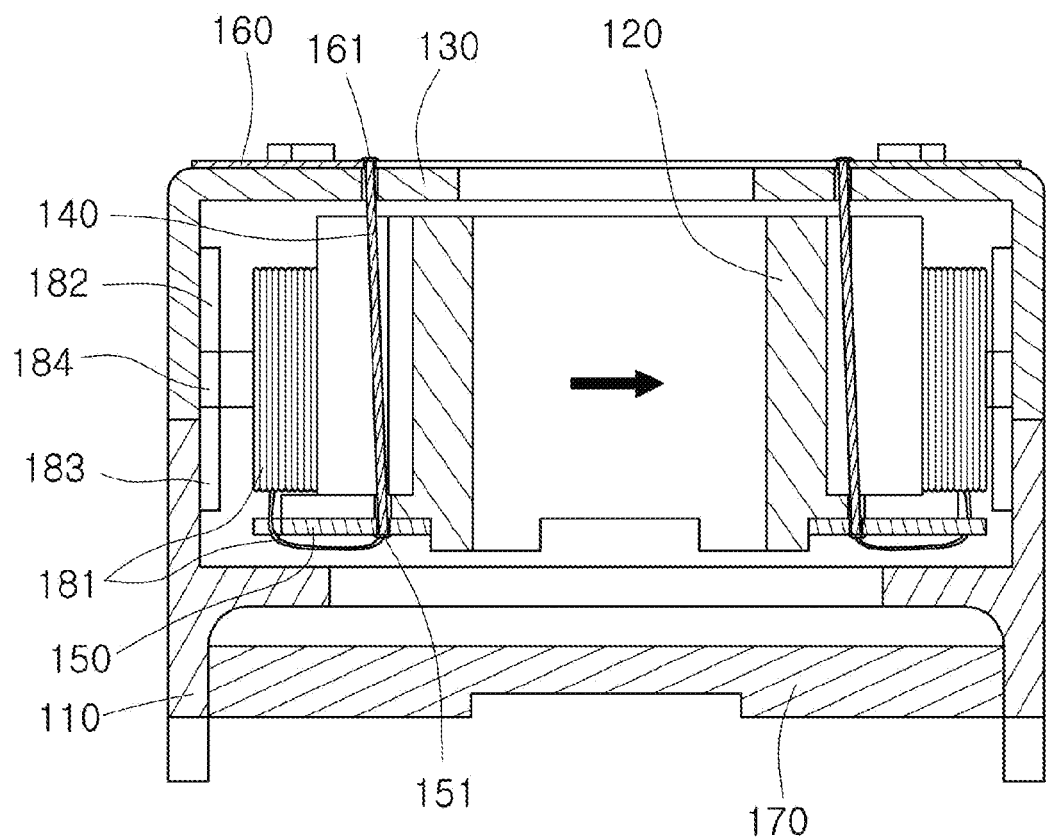
FIG. 5 is a sectional view illustrating operation state of the photography device of FIG. 4.

FIG. 4 is a sectional view illustrating the photography device of FIG. 1; and FIG. 5 is a sectional view illustrating operation state of the photography device of FIG. 4.

Figure 3:
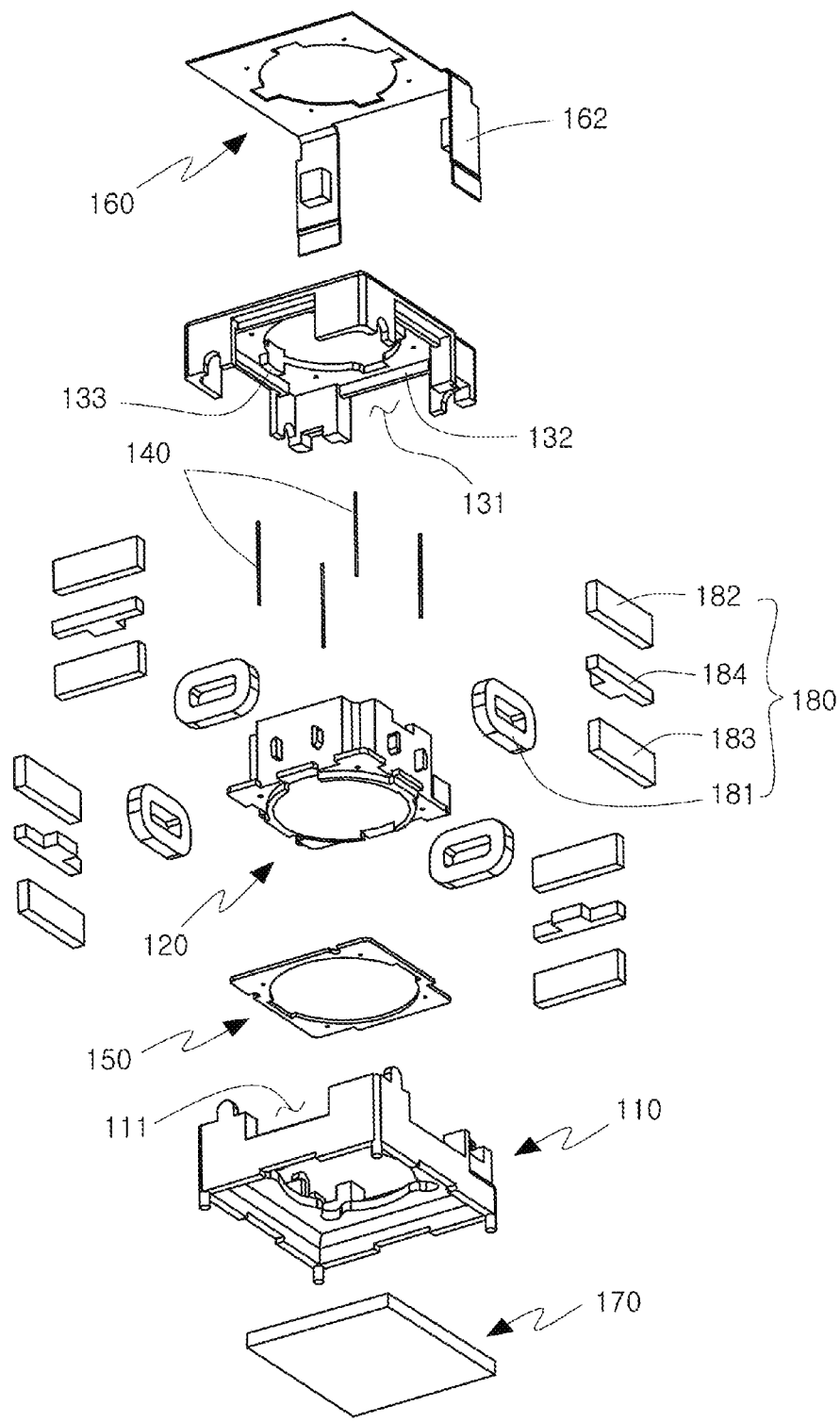
FIG. 3 is an exploded perspective view illustrating the photography device of FIG. 1, viewed from another direction.

As illustrated in FIGS. 1 to 3, the photography device of the present embodiment includes a base 110, a lens holder 120, a cover 130, a wire spring 140, a first substrate 150, a second substrate 160, a control unit 170 and a drive unit 180, and the drive unit 180 includes a coil member 181, an upper magnet 182, a lower magnet 183 and an iron piece member 184.

The base 110 has a generally rectangular shape and is formed with an opening hole of which upper and lower parts are opened, and an outer corner part projects upwardly to come in contact with the cover 130.

Also, in an outside of the base 110, i.e. between the upwardly projected corner parts, a lower fixation part 111 for mounting the lower magnet 183 therein is formed.

The lower fixation part 111 is formed in four places that are symmetric with each other along the outer surface of the base 110, and is formed by being depressed downwardly on the upper surface.

Also, below the lower fixation part 111, a stopping projection 112 that projects upwardly is formed.

The stopping projection 112 is formed as a bottom surface of the lower fixation part 111 abutting the inside of the base 110 is projected higher than the bottom surface of the lower fixation part 111 abutting the outside of the lower fixation part 111.

Therefore, the stooping projection 112 functions to stop the movement of the lower magnet 183 mounted to the outside of the lower fixation part 111 in a direction toward the inside of the base 110, i.e. in a direction toward the lens holder 120.

This base 110 is generally disposed above the image sensor that photograph an image of an object, and the lens holder 120 for mounting a lens therein is disposed above the base 110.

A size of the lens holder 120 is formed smaller than the inner width of the base 110 so as not to be interfered with the inner surface of the base 110, and the center of the lens holder is formed with a hole for inserting a lens (not shown) therein.

Both sides of the hole of the lens holder 120 are formed with a stopping groove 121 depressed downwardly, respectively.

Also, the lens holder 120 has a lower end of the corner part extending in a plate shape, and the wire spring is inserted in and passes through this corner part.

Also, the cover 130 is disposed above the lens holder 120 and mounted on the base 110 so as to enclose the lens holder 120.

The cover 130 has a rectangular shape and has an outer corner part, which projects toward the base 110 and is engagingly coupled with the base 110 so as to enclose the lens holder 120.

Also, the center of the cover 120 is formed with an opening hole that is communicated with the lens holder 120, and both sides of the opening hole are formed with a stopping projection 133 inserted in the stopping groove 121 of the lens holder 120, respectively.

The stopping projection 133 is downwardly projected toward the lens holder 120 and is stopped in the stopping groove 121.

As described above, the lens holder 120 is prevented from being rotated and lifted to damage the wire spring 140 by forming the stopping groove 121 in the upper part of the lens holder 121 and forming the stopping projection 133 downwardly projecting to be inserted in the stopping groove 121 in the cover 130.

Also, an upper fixation part 131 is formed between the outer corner parts of the cover 130 that are projected toward the base 110.

Like the lower fixation part 111, the upper fixation part 131 is formed in four places that are symmetric with each other along the outer surface of the cover 130, and is formed by being depressed upwardly on the lower surface.

Also, above the upper fixation part 131, a stopping projection 132 that projects downwardly is formed.

The stopping projection 132 is formed as a top surface of the upper fixation part 131 abutting the inside of the cover 130 is projected higher than the top surface of the upper fixation part 131 abutting the outside of the upper fixation part 131.

Therefore, the stooping projection 132 functions to stop the movement of the upper magnet 182 mounted to the outside of the upper fixation part 111 in a direction toward the inside of the cover 130, i.e. in a direction toward the lens holder 120.

As described above, it is possible to guide the positions upon assembling of the lower magnet 182 and the upper magnet 183 and prevent departure of the lower magnet 182 and the upper magnet 183 from the lower fixation part 111 and the upper fixation part 131 by forming the stopping projections 112, 132 that stop the movement of the lower magnet 182 and the upper magnet 182 in the direction toward the lens holder 120 in the lower fixation part 111 and the upper fixation part 131.

The wire spring 140 is made of metal material through which electricity flows, and has a characteristic that it is bent in left and right when an external force is applied and is restored to the original state when the external force is removed.

Also, the wire spring 140 is formed elongated in an up and down direction, and the upper end thereof is mounted to the cover 130 and the lower end is mounted to the lens holder 120 to elastically support the lens holder 120 upwardly above the cover 130.

That is, tension that floats the lens holder 110 from the base 110 by a predetermined gap is generated in the wire spring 140.

Also, a force is applied downwardly to the lens holder 120 in an assembling process of inserting the lens in the lens holder, and at this time, the wire spring 140 supports the lens holder 120 upwardly and tightly since its upper end is fixed to the cover 130 and thus does not move.

As described above, it is possible to generate the force applied to the wire spring in a direction that lengthen the wire spring 140 and thus prevent the wire spring 140 from being excessively bent to be damaged by mounting the upper end of the wire spring 140 to the cover 130 and the lower end to the lower end of the lens holder 120 to support the lens holder 120 with respect to the cover 130.

The lower end of the wire spring 140 is penetratively inserted in the lens holder 120 and the wire spring 140 is connected with the first substrate 150 mounted on the lower end of the lens holder 120.

The first substrate 150 is a rectangular shaped printed circuit board (PCB) and is made of electrically insulated synthetic resin, and is formed with an opening hole that is communicated with the lens holder 120 and first copperplate parts 151, into which the lower end of the wire spring 140 is penetratively inserted and fixed, in four symmetric positions with respect to the opening hole.

The first copperplate part 151 is made by attaching a copperplate along the outer surface of the hole that is penetrated in up and down direction, and is formed so as to allow lead to be easily welded.

That is, the lower end of the wire spring 140 inserted in the first copperplate part 151 is soldered and fixed to the first copperplate part 151.

Also, the upper end of the wire spring 140 is penetratively inserted in the cover 130 and connected with the second substrate 160 mounted above the cover 130.

The second substrate 160 has a rectangular shape, and is formed with an opening hole that is communicated with the lens holder 120 and second copperplate parts 161, into which the upper end of the wire spring 140 is penetratively inserted and fixed, in four symmetric positions with respect to the opening hole.

Like the first substrate 150, the upper end of the wire spring 140 is soldered and fixed to the second copperplate part 161 of the second substrate 160.

Also, the second substrate 160 is formed with a flexible circuit unit 162 that electrically connects the second substrate 160 and the control unit 170.

The flexible circuit unit 162 is made of a flexible printed circuit board (FPCB) so that is can be easily bent.

Also, the flexible circuit unit 162 is formed so as to be electrically connected with the second copperplate part 161.

That is, a metal plate extends between the flexible circuit unit 162 and the second copperplate part 161 of the second substrate 160 so as to flow electricity therebetween.

This flexible circuit unit 162 is formed extending to the lower side of the base 110 along the side surfaces of the cover 130 and the base 110.

At this time, the side surfaces of the cover 130 and the base 110 are formed with a seating groove 135 in which the flexible circuit unit 130 is inserted and seated.

The seating groove 135 is formed low toward the inside of the cover 130 or the base 110 so that the flexible circuit unit 162 is not projected over the outer surface of the cover 130 or the outer surface of the base 110.

As described above, it is possible to make the anti-shake device having same overall outer width to thereby reduce the size and simplify the outer appearance by forming the seating groove 135 in which the flexible circuit unit 130 is inserted and seated on the side surfaces of the cover 130 and the base 110.

Meanwhile, the control unit 170 is mounted below the base 110 and connected with the flexible circuit unit 162 to control power supplied to the drive unit 180.

The drive unit 180 is mounted between the base 110 and the cover to move the lens holder 120 in a horizontal direction upon power apply.

That is, the drive unit 180 is connected with the lower end of the wire spring 140 or the first substrate 150, and is electrically connected with the wire spring 140 and receives power from the control unit 170 to move the lens holder 120 in the horizontal direction.

Specifically, the coil member 181 of the drive unit 180 is an electric wire in which a metal wire through which electricity flows is coated by an insulator, and is wound in a direction parallel to the side surface of the lens holder 120.

Also, the coil member 181 is mounted on the four symmetric positions on the outer surface of the lens holder 120.

At this time, the outer surface of the lens holder 120 is formed with a guide projection 122 for guiding the position upon assembly of the coil member 181 and facilitating the fixation.

Also, the coil members 181 disposed oppositely to each other on the lens holder 120 are made by winding a single wire in opposite directions.

Both ends of this coil member 181, extend, as illustrated in FIG. 4, to be fixed to the first copperplate part 151 of the first substrate 150 together with the lower end of the wire spring 140 so that they are electrically connected with each other.

However, the end of the coil member 181 extending to both sides of the coil member 181 is electrically connected with the wire spring 140 disposed diagonally thereto.

It is possible to enlarge position for fixing the wire spring 140 and the drive unit 180 and facilitate the connection between them by connecting the lower end of the wire spring 140 and the drive unit 180 to the first substrate 150 formed with the first copperplate part 151 to which the lower end of the wire spring 140 is penetratively fixed as described above.

Also, it is possible to simplify the assembly process for connecting the wire spring 140 and the end of the coil member 181 by fixing the end of the coil member 181, together with the wire spring 140, to the first copperplate part 151 to which the wire spring 140 is penetratively fixed.

Meanwhile, the first substrate 150 is formed with an avoid groove 152 in which the end of the coil member 181 is disposed when fixing the end of the coil member 181 to the first copperplate part 151.

The avoid groove 152 is formed as the outer surface of the first substrate 150 is depressed inwardly, and the size of this avoid groove 152 is greater than the diameter of the end of the coil member 181.

By forming the avoid groove 152 in which the end of the coil member 181 is disposed and making the size of the avoid groove 152 greater than the diameter of the end of the coil member 181 as described above, it is possible to insert the end of the coil member 181, which is disposed below the first substrate 150, in the avoid groove 152 and thus prevent that the end of the coil member 181 is interfered with the base 110 upon movement of the lens holder 120.

The upper magnet 182 and the lower magnet 183 are formed in a hexahedral shape and two-pole magnetized in up and down direction.

Also, the upper magnet 182 is inserted in the upper fixation part 131 of the cover 130, and the lower magnet is inserted in the lower fixation part 111 of the base 110.

These upper magnet 182 and lower magnet 183 are disposed adjacently to the side surface of the coil member 181, and same polarities of them face to each other to form a magnetic field.

The iron piece member 184 has a hexahedral shape, where one end thereof is inserted between the upper magnet 182 and the lower magnet 183 and the other end is inserted in the center of the coil member 181.

That is, the one end of the iron piece member 184 is in contact with the lower surface of the upper magnet 182 and the upper surface of the lower magnet 183, and the other end is formed projecting toward the coil member 181 to be adjacent to the coil member 181.

Next, operation of the photography device constituted as described above will be described.

In general, the control unit 170 supplies power to the coil member 181 to correct shake when the camera senses the shake using a gyro-sensor mounted in the camera.

Therefore, the coil member 181 is electrically connected with the control unit 170 via the second substrate 160, the wire spring 140 and the first substrate 150, and receives power from the control unit 170 to move the lens holder 120 in a horizontal direction.

As illustrated in FIG. 4, as the lens holder 120 move to the right, the lower end of the wire spring 140 moves to right of the upper end of the wire spring 140 and thus the wire spring 140 leans to the right.

At this time, the end mounted to the lens holder 120 moves to the right together with the lens holder since it is fixed to the first substrate 150 together with the lower end of the wire spring 140.

That is, since the coil member 181 moves together with the lens holder 120 upon the horizontal movement of the lens holder 120, the end of the coil member 181 hardly moves.

By connecting the drive member 180 with the lower end of the wire spring 140 to electrically connect the drive member 180 with the wire spring 140 as described above, it is possible to minimize the external force applied to the drive unit 180 upon the horizontal movement of the lens holder 120 while the drive member receives the power via the wire spring 140.

The photography device with anti-shake function of the present invention is installed in a compact electronic device such as a hand-held device and moves the lens in a direction correcting shake when the shake is generated upon photographing of an object to thereby allow the object to be clearly photographed.

While the present invention has been described with respect to the specific embodiments, it will be apparent to those skilled in the art that various changes and modifications may be made without departing from the spirit and scope of the invention as defined in the following claims.

What is claimed is:

1. A photography device with a shake-correction structure, comprising:
    a base;
    a cover disposed above the base to form a housing having a space inside thereof;
    a lens holder disposed horizontally movably inside the space, the lens holder capable of holding a lens inside thereof;
    a coil member fixed to an outer surface of the lens holder and forming a magnetic field when an electric power is applied thereto;
    upper magnet and lower magnet fixed to an inner surface of the housing to be positioned spaced apart from the lends holder and the coil member;
    an iron piece member one end of which is fixed to an inner surface of the housing between the upper magnet and the lower magnet, and the other end of which passes through a hollow space in a center of the coil member, the coil member being spaced apart from the iron piece member;
    a wire spring of which upper end is fixed to the cover and of which lower end is fixed to the lens holder to elastically and movably support the lens holder inside the space of the housing, wherein the wire spring is formed of an electric conductive material and the coil member is electrically connected to an electric power source through the wire spring,
    wherein the lens holder moves horizontally by interaction of an electromagnetic field generated by the coil member with the iron piece member and the upper and lower magnets.

2. The photography device of claim 1, further comprising: a first substrate attached to a bottom surface of the lens holder.

3. The photography device of claim 2, wherein the lower end of the wire spring is attached to the first substrate.

4. The photography device of claim 2, wherein a side surface of the cover is formed with an upper fixation part in which the upper magnet is inserted and a side surface of the base is formed with a lower fixation part in which the lower magnet is inserted, and the upper fixation part and lower fixation part are formed with a stopping projection that prevents the upper magnet or the lower magnet from moving towards the lens holder, respectively.

5. The photography device of claim 1, further comprising:
    a control unit mounted below the base to control the electric power supplied to the drive unit coil member; and
    a second substrate to which the upper end of the wire spring is penetratively fixed,
    wherein the second substrate is formed with a flexible circuit unit that electrically connects the second substrate with the control unit and side surfaces of the cover and the base are formed with a seating groove in which the flexible circuit unit is inserted and seated.

6. The photography device of claim 1, wherein the upper part of the lens holder is formed with a stopping groove, and the cover is formed with a stopping projection which projects downwardly and inserted in the stopping groove, and rotation and ascent of the lens holder are prevented by the stopping projection and the stopping groove.

* * * * *